UNITED STATES PATENT OFFICE.

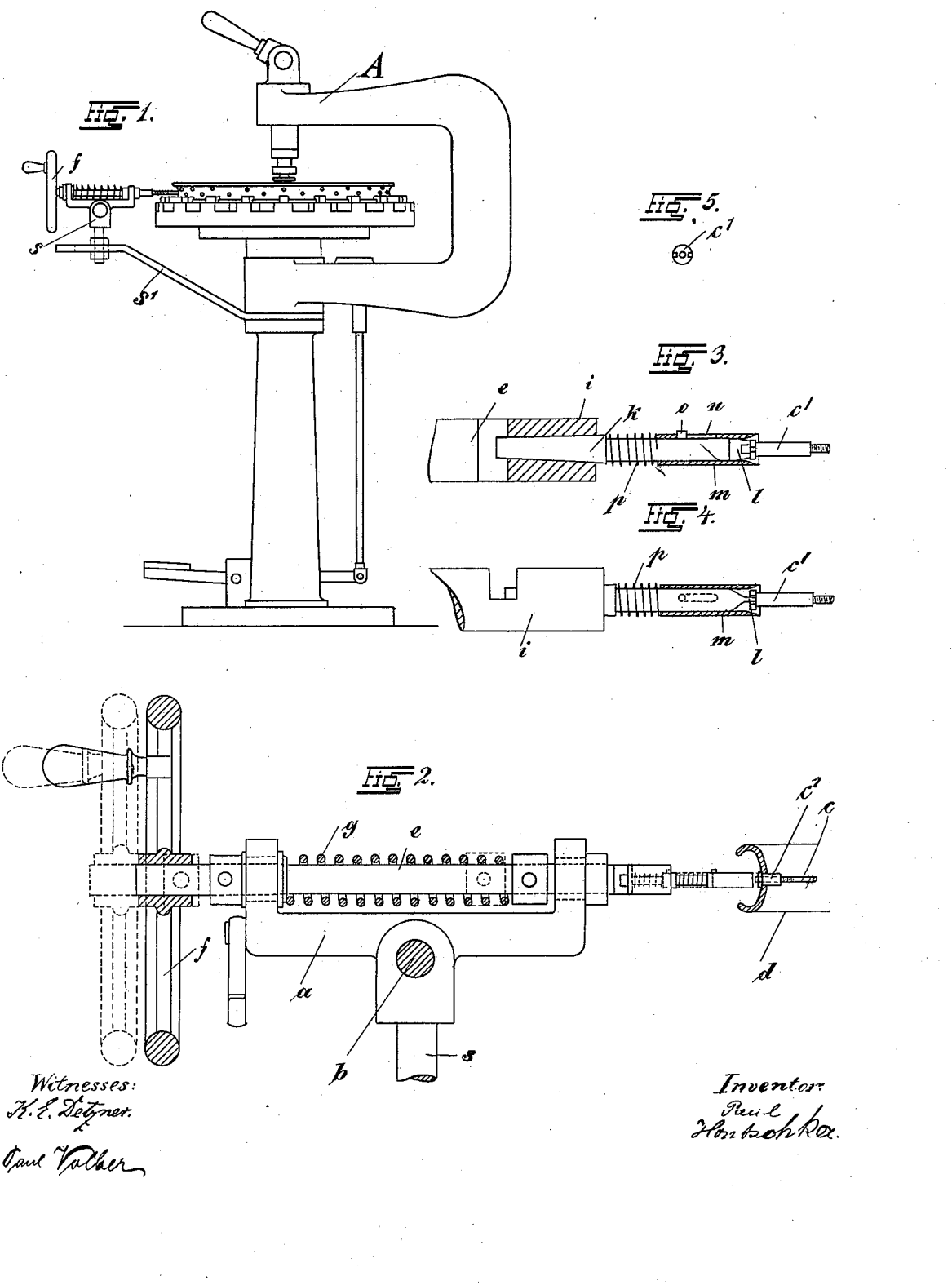

PAUL HONTSCHKA, OF BRESLAU, GERMANY.

APPARATUS FOR TIGHTENING SPOKES.

SPECIFICATION forming part of Letters Patent No. 618,415, dated January 31, 1899.

Application filed August 25, 1897. Serial No. 649,463. (No model.)

*To all whom it may concern:*

Be it known that I, PAUL HONTSCHKA, a subject of the King of Prussia, German Emperor, residing at Breslau, in the Kingdom of Prussia, German Empire, have invented certain new and useful Improvements in Apparatus for Tightening Spokes, of which the following is a specification.

This invention relates to apparatus for tightening the spokes of vehicle-wheels, and particularly of that class of wheels in which the ends of the spokes are retained in the wheel-rim by means of a nipple which passes through the rim and is screwed onto the spoke end; and the object of the invention is to provide means whereby the nipples after they have been started on the spoke ends by other apparatus or by hand may be quickly and easily screwed down to the rim, thus drawing the parts together into a solid and rigid wheel.

The invention consists of an apparatus for tightening the spokes of wheels, consisting of a spring-actuated spindle, means for pivotally supporting the spindle so that its forward or operating end may be brought in engagement with a spoke end and the nipple screwed thereon, a nipple-driver at one end of said spindle, and a spring-actuated sleeve movable longitudinally on said nipple-driver and adapted to catch the nipple of the spoke to be tightened, and, further, in certain details of construction and combinations of parts to be more fully described hereinafter and finally pointed out in the claims.

In the accompanying drawings, Figure 1 is a side view of my improved spoke-tightening apparatus, showing the same mounted on a centering-machine. Fig. 2 is a side elevation, partly in section, of the apparatus drawn on a larger scale. Figs. 3 and 4 are detail views, partly in section, of the nipple-engaging or forward portion of the apparatus; and Fig. 5 is a top view of a nipple.

Referring to the drawings, $e$ represents the spindle of my improved spoke-tightening apparatus, which is supported in bearings of the frame $a$ and provided at one end with a hand-wheel $f$. A helical spring $g$ extends upon the spindle between the bearings of the frame and abuts at one end against the frame and at the other end against a collar which is secured to the spindle by a set-screw. At the opposite end $i$ of the spindle $e$ is arranged a nipple-driver $k$, one of its ends being seated in the spindle and the forward end $l$ formed into such shape as to engage the nipple-head and hold it firmly during the operation of tightening. Upon the nipple-driver is mounted a sleeve $m$, which is provided at one side with a longitudinal slot $n$, through which projects a pin or stud $o$, which is fixed in the nipple-driver $k$. The sleeve $m$ is thus permitted to move lengthwise on the nipple-driver, but cannot rotate separately from nor slip off the same. A helical spring $p$ extends upon the nipple-driver, as shown, and keeps the sleeve $m$ pressed forward normally to its farthest limit. The frame $a$ is pivoted by means of a pin $b$ to a standard $s$, which is supported in an arm $s'$ of the centering-machine A, in connection with which my improved spoke-tightening apparatus is employed.

The operation of my improved apparatus is as follows: The wheel the spokes of which are to be tightened is placed in the centering-machine and the spoke-tightening apparatus is so adjusted on the arm $s'$ that the spindle $e$ is level and the nipple-catching sleeve $m$ is normally against the rim $d$. The nipples may be screwed on the spoke ends before placing the wheel in the centering-machine or may be started after the parts are placed in position on the same, according to the kind of centering-machine used. As stated, the object of the invention is simply to tighten and adjust the nipples and not to apply them to the spoke ends in the first instance. In the centering-machine illustrated the table can be turned, thus bringing any spoke into line with the nipple-catcher $m$, and by means of the pivot $s$ the spoke-tightening apparatus is tilted bodily so as to bring the nipple-catcher directly in line with the spoke $c$ and the nipple $c'$ to be tightened. As the nipples project slightly from the rim $d$, it is necessary to remove the nipple-catcher a slight distance from the rim. This is done by a backward pull on the hand-wheel $f$, as indicated in dotted lines in Fig. 2. This compresses the spring $g$ and draws the entire spindle back, together with the nipple-driver *l* and nipple-catcher *m*. The apparatus is then tilted slightly, either up or down, according as the spoke to be tightened is at one side or the other of the median line of the rim, and the nipple-catcher brought directly over the projecting nipple which is to be screwed up. The hand-wheel is then released, and the spring *g* forces the spindle forward. The end of the sleeve *m* is beveled at its inner edge to facilitate catching the nipple, and hence it is necessary to give the spindle only the general direction toward the nipple and spoke. The nipple-catcher *m*, having caught the nipple, guides the nipple-driver *k*, and the latter engages the nipple. All that is now necessary to tighten the spoke is to turn the spindle by means of the hand-wheel *f* until the nipple is drawn up and the desired tension of the spoke secured. As the spindle is turned and the nipple screwed on the spoke the nipple-driver *k* is held constantly in engagement with the nipple by means of the spring *g*, which keeps the nipple-driver pressed forward against the nipple. The nipple having been tightened, the spindle is then pulled back by means of the hand-wheel, the vehicle-wheel turned in the centering-machine to bring the next spoke opposite the tightening apparatus, the same tilted as required, released, and the spoke tightened in the same manner as the first. The operation is repeated until all the spokes are tightened and the wheel thus made rigid and firm.

In case a centering-machine is used in which the wheel is held so that it cannot be rotated the spoke-tightening apparatus may be arranged on a rotating arm of the centering-machine, so as to be moved about the wheel in order to reach every spoke of the same.

Having thus described my invention, I claim as new and desire to secure by Letters Patent—

1. An apparatus for tightening the spokes of wheels, consisting of a spring-actuated spindle, means for pivotally supporting the same so that its forward end may be brought in engagement with a spoke end and nipple thereon, a nipple-driver at one end of said spindle, and a spring-actuated sleeve movable longitudinally on said nipple-driver and adapted to catch the nipple of the spoke to be tightened, substantially as set forth.

2. In an apparatus for tightening the spokes of wheels, the combination of a spindle, means for pivotally supporting the same so that its forward end may be brought in engagement with a spoke end and nipple thereon, a hand-wheel fixed to said spindle, a helical spring encircling the spindle, a nipple-driver fitted to the spindle, and a spring-actuated sleeve upon the nipple-driver, substantially as set forth.

3. In an apparatus for tightening the spokes of wheels, the combination of a spindle, means for pivotally supporting the same so that its forward end may be brought in engagement with a spoke end and nipple thereon, a hand-wheel fixed to the spindle, a helical spring on said spindle, a nipple-driver fitted to the spindle, and a spring-actuated sleeve upon the nipple-driver, said sleeve having its inner edge beveled for engaging the nipple, substantially as set forth.

In testimony that I claim the foregoing as my invention I have signed my name in presence of two subscribing witnesses.

PAUL HONTSCHKA.

Witnesses:
HENRY HASPER,
PAUL ZOLHER.